United States Patent Office 2,742,440
Patented Apr. 17, 1956

2,742,440

METHOD OF PREPARING FINELY DIVIDED POLYAMIDES

Louis L. Stott, Reading, Pa., and Laurence R. B. Hervey, West Concord, Mass., assignors, by direct and mesne assignments, to The Polymer Corporation, Reading, Pa., a corporation of Pennsylvania No Drawing. Application February 26, 1952, Serial No. 273,566

9 Claims. (Cl. 260—2.3)

This invention relates to the production of synthetic linear polyamides in finely divided form.

The synthetic linear polyamides with which this invention is primarily concerned includes the type described in United States Patents Nos. 2,071,250, 2,071,253 and 2,130,948 and particularly those which are insoluble in the lower saturated aliphatic alcohols or alcohol-water mixtures at atmospheric pressures. This application is a contination-in-part of U. S. application Ser. No. 91,638, filed May 5, 1949, and now abandoned.

These polyamides as described above, or as otherwise identified hereafter, can be obtained, for example, by self-polymerization of monoamino-monocarboxylic acid, or by reacting a diamine with dibasic carboxylic acid in substantially equimolecular amounts, it being understood that reference herein to amino acids, diamines and dibasic carboxylic acids is intended to include the equivalent amide forming derivatives of these reactants.

These linear polyamides include also polymers obtained by admixture of other linear polymer-forming reactants, as for instance glycol-dibasic acid mixtures in the case of polyester amides, with the mentioned polyamide-forming reactants. The best results in the practice of the invention described herein, however, are obtained with unmodified straight polyamides. In the simple polyamides the average number of carbon atoms separating the amide group is at least two. On hydrolysis with hydrochloric acid the amino acid polymers yield the amino acid hydrochloride, and the diamine-dibasic acid polymers yield the diamine hydrochloride and the dibasic carboxylic acid. For the sake of simplicity, the linear polyamides described above will be referred to herein as nylon, but only those polyamides which are insoluble in the solvents described and claimed herein at temperatures possible at atmospheric pressures are intended to be included in the appended claims, and are the subject of this invention.

Solvents for synthetic linear polyamides are known. The alcohol-insoluble types such as polyhexamethylene adipamide and polyhexamethylene sebacamide may be dissolved in such solvents as phenols and strong mineral acids. Such solvents have, however, severe disadvantages.

Waste and scrap nylon are available from several sources, e. g. rejects during manufacture, turnings from the machining of solid nylon shapes, skeleton scrap resulting when parts are stamped from nylon strips, trimmings from the cutting of nylon fabrics, and used nylon cloth and articles. If this scrap and waste are absolutely clean, it can be remelted under controlled conditions and used over again, but often such material is contaminated with foreign materials such as dirt, oil, grease, or floor sweepings, or it may contain unwanted impurities such as cotton thread, delusterants, etc. This contaminating material may be removed by filtration, but none of the solvents now known is fully satisfactory for this purpose since such solvents introduce materials which are difficult to remove, or the solvents degrade the polymer unduly, or are too corrosive or are too expensive for commercial use.

It is also desirable to reduce the high molecular weight polyamides described above to a fine powder suitable for molding purposes whether the origin be from virgin or scrap nylon material.

An object of this invention is to prepare solutions of polyamides which are insoluble in lower saturated aliphatic alcohols or alcohol-water mixtures at temperatures obtaining at atmospheric pressures.

Another object is to prepare free-flowing solutions of polyamides with relatively inexpensive, volatile and non-corrosive solvents which do not degrade polyamides.

Still another object is to prepare a suitable molding powder from either scrap or virgin nylon.

These and other objects may be accomplished by dissolving the polyamides in an alcohol-water mixture at elevated temperatures and pressures. The alcohols employed are saturated aliphatic alcohols containing from one to five carbon atoms, and are mixed with from 5% to 65% water by volume.

In carrying out this invention, temperatures considerably above the normal boiling point of the alcohol-water mixture, must be employed to dissolve the nylon. The temperatures at which solution takes place range from about 160° C. for a methyl alcohol-water mixture to about 190° C. for an amyl alcohol-water mixture. Provision must therefore be made for carrying out the solvation under elevated pressure conditions. Sufficient pressure may be obtained by carrying out the solvation in a closed pressure-resistant container so that when the temperature is raised the pressure automatically builds up. Sufficient pressure to allow a temperature increase up to the dissolving point may, of course, be provided in any other suitable way as by introducing into the reacting zone an inert gas such as nitrogen. This may be accomplished by introducing the gas through a valve arrangement in the reaction container.

It has been found by extensive laboratory work that at least about 5% water is necessary to carry out our process, and that at least 35% alcohol is also necessary. For practical purposes solutions containing at least 1% nylon in solution are required, though greater concentrations are preferable for most industrial operations.

A characteristic of our invention is that the solvents and polyamides employed yield a very finely divided powder upon cooling of a solution of the nylon. This powder may be readily recovered by removal of the solvent as by washing with water or by evaporation of the solvent. Washing with water is preferred since it may help to remove any impurities such as particles of textile waste. Cooling may be accomplished by any practical means, but running cold water into the solution serves to cause rapid cooling with attendant precipitation of the nylon as a fine powder. The powder itself is unique in that it may be pressed at room temperature into the desired shape, removed from the mold or other shaping device, and sintered by heating it to a temperature below its melting point. The resultant product appears to have better dimensional stability and greater freedom from strains. While it is probable that the unusable characteristics of the powder may be due to the extremely small particle size, it has not been possible to duplicate the molding procedure with powder produced by mechanical grinding. It is also to be observed that the process of dissolving and precipitating the nylon is carried out under non-oxidizing conditions. Caution must be further exercised during the step of removal of the solvent and storage of the final powder in order not to oxidize the nylon. Whereas recovery of the powder from the solvent and subsequent drying may be carried out in the atmosphere, the powder should not be subjected to elevated temperatures and should be stored in tightly closed containers.

In order to explain our invention more clearly, the following examples are given. In Examples 1–10 the ratio of 18.5 grams of polymer to 100 cc. of solvent was employed. The chips of polyamide and solvent were mixed, the air replaced by nitrogen, and sealed in a transparent container and placed in an oven. While the mixture was agitated, the temperature was raised slowly until the nylon all passed into solution, and then was lowered to precipitate the polyamide in the form of a powder. That water and alcohol percentages are on a volumetric basis.

Example 1

Nylon (polyhexamethylene adipamide) was mixed with a solvent consisting of a mixture of 50% water and 50% methyl alcohol. The temperature of the mixture was slowly raised and at about 160° C. a clear mobile solution was formed. When cooled, the nylon precipitated as a fine powder.

Example 2

Nylon chips (polyhexamethylene adipamide) were mixed with a solution containing 5% water and 95% ethyl alcohol. At about 180° C. the nylon was all dissolved to form a clear, low-viscosity solution. Upon cooling, the solution first became very viscous, then particles began to precipitate out (at about 141° C.) and finally a solid mass is formed which consists of nylon in fine particles and solvent intimately mixed. The alcohol was removed by washing with water and allowing the nylon to dry at room temperature.

Example 3

Nylon chips (polyhexamethylene adipamide) were mixed with a solution containing 20% water and 80% ethyl alcohol. At 168° C. the nylon was completely dissolved to form a clear solution. Upon cooling the nylon began to precipitate at 159° C. as a fine powder.

Example 4

Following the procedure of the previous examples, a 50% water-50% ethyl alcohol mixture dissolved chips of polyhexamethylene adipamide at about 162° C. Upon cooling a fine powder precipitated from the mixture beginning at about 157° C.

Example 5

A solvent consisting of 65% water and 35% ethyl alcohol dissolved chips of polyhexamethylene adipamide with which it was admixed at about 181° C. Upon cooling nylon in the form of a fine powder precipitated.

Example 6

A mixture of 50% water and 50% n-propyl alcohol completely dissolved polyhexamethylene adipamide at 165° C. to form a clear mobile solution. Upon cooling a fine powder precipitated, starting at about 145° C.

Example 7

Nylon (polyhexamethylene adpamide was mixed with a solvent mixture consisting of 50% water and 50% iso-propyl alcohol. At about 170° C. the nylon was completely dissolved to give a clear free-flowing solution. When cooled the nylon precipitated as a fine powder beginning at about 157° C.

Example 8

A normal butyl alcohol (90%)-water (10%) mixture, when heated with nylon (polyhexamethylene adipamide), completely dissolved the nylon at 180° C. to form a clear mobile solution. Upon cooling a fine precipitate of nylon formed.

Example 9

Nylon chips (polyhexamethylene adipamide) were heated with a mixture consisting of 50% water and 50% tertiary butyl alcohol. At 172° C. all the nylon was dissolved to form a somewhat viscous solution and upon cooling the nylon precipitated as a fine powder beginning at about 152° C.

Example 10

A mixture consisting of 90% normal amyl alcohol and 10% water was heated with nylon chips (polyhexamethylene adipamide). At 188° C. a clear viscous solution of the nylon was formed, and upon cooling a fine powder precipitated, beginning at about 181° C.

Example 11

3.3 grams of polyhexamethylene sebacamide were heated with a mixture of 20 cc. of solvent consisting of 90% amyl alcohol and 10% water in a sealed tube. At 190° C. the nylon was all dissolved to form a clear solution. Upon cooling the nylon began to precipitate at about 179° C. and at room temperature it was completely precipitated as a fine powder.

Example 12

5.5 grams of polyhexamethylene sebacamide were heated with 29.6 cc. of a solvent mixture consisting of 75% methyl alcohol and 25% water. The polymer dissolved at 203° C., and upon cooling precipitated at 118° C.

Example 13

5.5 grams of polyhexamethylene sebacamide were heated with 29.5 cc. of a solvent mixture consisting of 50% n-propyl alcohol and 50% water. The polymer dissolved at 212° C., and upon cooling began to precipitate at about 188° C. as a fine powder.

Example 14

3.3 grams of the polymer of epsilon-caprolactam were heated with 20 cc. of a solvent consisting of 90% ethyl alcohol and 10% water by volume. At 166° C. the nylon was all dissolved to form a clear solution. Upon cooling the polymer began to precipitate at 100° C. in the form of a powder.

Solution becomes progressively more difficult (as shown by the temperature at which the nylon goes into solution) as the number of carbon atoms of the alcohol increases. It is therefore preferred to use alcohols, or mixtures of alcohols, containing one, two, or three carbon atoms, i. e., methyl, ethyl or propyl alcohols. Maximum solubility for any given alcohol is obtained when the alcohol is admixed with about 25% water, although from 35% to 95% alcohol-65% to 5% water ratios may be employed in particular cases.

It will be appreciated that each polymer varies somewhat in its solubility characteristics and that the alcohol-water admixtures also vary in their ability to dissolve any specific polymer. Polyhexamethylene adipamide may be dissolved in a solvent consisting of 35% methanol and 65% water, while polyhexamethylene sebacamide require a mixture consisting of 75% methanol and 25% water. On the other hand, n-amyl alcohol is not very soluble in water and solutions of n-amyl alcohol in water to an extent of more than a few per cent is not possible. Thus in the practice of our invention the characteristics of each particular polymer and each particular solvent mixture must be taken into account. In any case it has been found that some water must be present and that at least 35% by volume of alcohol must also be present in any solvent mixture.

It can be readily appreciated that the process herein described is applicable to all simple linear polyamides which are considered insoluble in alcohols or alcohol-water mixtures, but which are soluble in phenol. Polyamides fulfilling this description are of two types, those derived from polymerizable monoamino carboxylic acids or their amide-forming derivatives, and those derived from the reaction of suitable diamines with suitable dicarboxylic acids or amide-forming derivatives of dicarboxylic acids. On hydrolysis with mineral acids, the polyamides yield monomeric acide-forming reactants. For example, a polyamide derived from a diamine and a dibasic acid yields on hydrolysis with hydrochloric acid the dibasic acid and the diamine hydrochloride and a polyamide derived from an amino alcohol and a dibasic acid yields mixtures of amino alcohol hydrochloride and dibasic carboxylic acid. Similarly, an amino-acid type polyamide yields an amino-acid hydrochloride.

In particular, this invention is concerned with the simple, unsubstituted polyamides, such as the polymers formed by the reaction of tetramethylene diamine with adipic acid, tetramethylene diamine with suberic acid, tetramethylene diamine with sebacic acid, hexamethylene diamine with adipic acid, hexamethylene diamine with suberic acid, hexamethylene diamine with sebacic acid, or the polymerization product of epsilon-caprolactam. These polymers all dissolve in phenol but not in saturated aliphatic alcohols. They do dissolve in the alcohol-water solvents described herein by the process of our invention.

That the use of solvents in accordance with our process does not cause degradation of the polymer was shown by determining the intrinsic viscosity of untreated nylon and comparing it with the intrinsic viscosity obtained after dissolving, precipitating, and washing it. For each determination of intrinsic viscosity a 0.5% solution in m-cresol was prepared and the viscosity was measured at 25° C. in a Stormer viscosimeter. Six samples of each material were run and the mean average of the values taken. Calculation of the intrinsic voscosity was made in accordance with the expression $$\log_e \frac{\lambda r}{C}$$

where $\lambda r$=viscosity of the polymer in m-cresol (i. e. 0.5% concentration) divided by the viscosity of pure m-cresol in the same units and at the same temperature (25° C.), and C is the concentration in grams of polymer per 100 cc. of solution.

The following table reports the results obtained:

|  | Viscosity, sec. | Intrinsic Viscosity |
|---|---|---|
| Undissolved nylon | 17.0 | .65 |
| Nylon precipitated from 50% methanol | 17.1 | .66 |

In the examples given above the nylon has been divided in the form of chips. As in any solvation process, fine subdivision of the material to be dissolved speeds the solvation, though such division is not required.

In the recovery of waste nylon by our process, cotton threads, dirt, and other extraneous materials not soluble in the alcohols hereinabove specified are easily separated from the nylon solution. This may be accomplished by thoroughly washing the waste nylon with a detergent solution to remove any surface material present, placing the waste in a sealed container with sufficient solvent, introducing an inert gas such as nitrogen if desired, heating the mixture until it dissolves in the solvent, centrifuging the container, cooling the mixture to precipitate the nylon, washing it, and carefully drying it. If desired, the hot solution may be passed through a filter press to remove undesirable materials. Such operations must, of course, be carried out at the pressures and temperatures required to keep the nylon in solution as hereinbefore described and may be applied equally well to mixtures of virgin and scrap nylon, or to virgin nylon alone. Virgin nylon need not be filtered, nor need scrap nylon if it is satisfactorily clean.

Powder precipitate products made according to the present invention are disclosed and claimed in our copending divisional application Serial No. 555,775, filed December 28, 1955.

Having thus described our invention, we claim:

1. The process of producing a finely divided synthetic linear polyamide which comprises forming a mixture of said polyamide and a solvent, placing said mixture in a closed, substantially oxygen-free system, heating said mixture under superatmospheric pressure to a temperature above the boiling point of said solvent sufficient to dissolve said polyamide, cooling said mixture to percipitate said polyamide in the form of finely divided particles and removing said solvent, said solvent being a mixture consisting of at least 5% water by volume, and a saturated aliphatic alcohol having one to five carbon atoms, said polyamide being one which is soluble in phenol and insoluble in lower saturated aliphatic alcohols below their boiling point at atmospheric pressures, and being one which on hydrolysis with hydrochloric acid yields material selected from the group consisting of (a) amino acid hydrochlorides; (b) mixtures of diamine hydrochloride and dibasic carboxylic acid; and (c) mixtures of amino alcohol hydrochloride and dibasic carboxylic acid.

2. The process according to claim 1 wherein the solvent is methyl alcohol-water mixture.

3. The process according to claim 1 wherein the solvent is an ethyl alcohol-water mixture.

4. The process according to claim 1 wherein the solvent is a propyl alcohol-water mixture.

5. The process of producing finely divided polyhexamethylene adipamide which comprises forming a mixture of said polyamide and a solvent, placing said mixture in a closed, substantially oxygen-free system, heating said mixture under superatmospheric pressure to a temperature above the boiling point of said solvent sufficient to dissolve said polyamide, cooling said mixture to precipitate said polyamide in the form of finely divided particles and removing said solvent, said solvent being a mixture consisting of at least 5% water by volume and a saturated aliphatic alcohol having one to five carbon atoms.

6. The process of producing finely divided polyhexamethylene sebacamide which comprises forming a mixture of said polyamide and a solvent, placing said mixture in a closed, substantially oxygen-free system, heating said mixture under super-atmospheric pressure to a temperature above the boiling point of said solvent sufficient to dissolve said polyamide, cooling said mixture to precipitate said polyamide in the form of finely divided particles and removing said solvent, said solvent being a mixture consisting of at least 5% water by volume and a saturated aliphatic alcohol having one to five carbon atoms.

7. The process of producing a finely divided polymer of epsilon-caprolactam which comprises forming a mixture of said polyamide and a solvent, placing said mixture in a closed, substantially oxygen-free system, heating said mixture under super-atmospheric pressure to a temperature above the boiling point of said solvent sufficient to dissolve said polyamide, cooling said mixture to precipitate said polyamide in the form of finely divided particles and removing said solvent, said solvent being a mixture consisting of at least 5% water by volume and a saturated aliphatic alcohol having one to five carbon atoms.

8. The process of producing finely divided synthetic linear polyamide from scrap polyamide which comprises the steps of forming a mixture of said polyamide and a solvent, placing said mixture in a closed, substantially oxygen-free system, heating said mixture under superatmospheric pressure to a temperature above the boiling point of said solvent sufficient to dissolve said polyamide to form a solution, separating any undissolved material from said solution, cooling said solution to precipitate said polyamide in the form of finely divided particles and removing said solvent, said solvent being a mixture consisting of at least 5% water by volume and a saturated aliphatic alcohol having one to five carbon atoms, said polyamide being a member selected from the group consisting of polyhexamethylene adipamide, polyhexamethylene sebacamide, and the polymer of epsilon-caprolactam.

9. The process of claim 1 wherein the solvent is a mixture consisting of from 5% to 65% water by volume and a saturated aliphatic alcohol having one to five carbon atoms.

References Cited in the file of this patent

UNITED STATES PATENTS

| | | |
|---|---|---|
| 2,130,948 | Carothers | Sept. 20, 1938 |
| 2,359,878 | Schupp | Oct. 10, 1944 |
| 2,388,278 | Moncrieff et al. | Nov. 6, 1945 |
| 2,592,616 | Stott et al. | Apr. 15, 1952 |
| 2,639,278 | Stott et al. | May 19, 1953 |

FOREIGN PATENTS

| | | |
|---|---|---|
| 989,062 | France | Sept. 4, 1951 |